Patented Aug. 19, 1941

2,252,991

UNITED STATES PATENT OFFICE 2,252,991

FRICTION MATERIAL AND METHOD OF MAKING SAME

Rudolph Edward Steck, Bridgeport, Conn., assignor to Raybestos-Manhattan, Inc., Passaic, N. J., a corporation of New Jersey No Drawing. Application November 13, 1939, Serial No. 304,118

22 Claims. (Cl. 106—36)

This invention relates to improvements in friction material suitable for brake blocks, brake lining, clutch facings and the like and to a novel method of manufacture, and particularly asbestos base friction material whose primary binder constituent is a metallic oxidation product formed in situ the precomposited and shaped material.

It has long been known that organic binders in friction elements have several pronounced disadvantages, notable ones being the lowering of coefficient of friction in an almost direct proportion to the amount of binder used, the disintegration of the binder in severe applications, erratic friction due to complete or partial breakdown of the binder and the smoothness of engagement dependable to a large degree on the temperature of the facing at the time of the engagement.

Other types of friction materials are known to the art in which no organic binder is utilized. Such friction materials are essentially metallic in character. They are derived by compressing powdered metals followed by a sintering in an inert atmosphere to yield an actual metallic bond between the granules. This type of friction material is expensive and has an undesirably high specific gravity. The coefficient of friction is not high and the use of such elements is thus restricted to certain fields.

This invention has as its distinctive feature a primary binder or structure forming material that is inorganic in nature, is resistant to heat, withstands severe applications in a brake or clutch and has a desirable coefficient of friction. The primary constituents have a lower average specific gravity than that of friction elements of essentially metallic character, and after oxidation the ultimate specific gravity is appreciably less.

I have found that a composition comprising essentially a mixture of metallic particles and asbestos, both in relatively large proportions by weight, when preformed to a desired shape of friction material and thereafter treated to promote reactions of an oxidizing nature, there results a product of unique frictional and structural characteristics, firmly bonded and interlocked, of great strength, and great heat resistance and is practically indestructible from a heat standpoint if no organic binder is present. However, the friction body produced in accordance with this invention will tolerate the addition of auxiliary organic binders as high as 50% of the amounts normally used without their usual harmful effect.

It is of prime importance, however, that the major proportions of the oxidation products of the incorporated metallic particles be formed in situ the preformed shape, and my invention is thus further distinguished from friction elements which have incorporated in their body metals in powdered or comminuted form and which remain or are caused to remain in substantially such metallic state in the finished element, or from friction compositions wherein a metallic oxide such as iron oxide is incorporated in the mix as such solely as a friction modificant.

In carrying out my invention I prefer for reasons of economy and facility to use as the initial metallic compounding constituent iron particles in the form of powder, either purified or impure, although other metals such as aluminum, lead, zinc, nickel, or any other suitable metal capable of being oxidized in situ of a shaped material or under substantially the conditions hereinafter specified may be used. The composition is also capable of being modified with minor amounts of auxiliary binder, either organic or inorganic, and appreciable quantities of friction agents to vary the characteristics of the product for specific uses or installations.

In carrying out the process of my invention, where use is made of iron particles as the compounded metal, it is only essential that the shaped element be treated with sufficient air and water for a sufficient period of time to substantially convert the iron to its oxidation products or rust. However, in order to promote and accelerate the conversion reaction the shaped material is either initially or secondarily treated with chemical reagents such as electrolytes or oxidizing agents in water and in the presence of an oxygen source such as air, and I may initially incorporate into the mix ingredients which aid in promoting the subsequent oxidization treatment.

The pre-forming of the friction material preparatory to inducing oxidation of the metallic constituent, may in general be carried out by various conventional shaping methods known to the friction material art, such as dry or wet molding, extruding or sheeting, consistent with the nature of the compounding ingredients and in a manner whereby air, water and/or solutions of electrolytes may be permitted or caused to act upon substantially all of the incorporated metallic particles for bringing about the oxidation reactions to a substantially uniform degree.

One example, by way of illustration and not limitation of materials initially compounded and shaped for making a friction element under this invention may be as follows:

| | Parts by weight |
|---|---|
| Powdered iron | 40 |
| Asbestos | 50 |
| Graphite | 5 |
| Sulfur | 5 |

These materials are mixed in the dry state in a mixed of the change-can type, in a Werner and Phleiderer type, a tumbling barrel or any type of mixer common to the art. Mixing is continued in a dry state for a sufficiently long time to allow a more or less uniform distribution of all constituents.

For wet sheet casting or wet molding sufficient liquid, usually water, to provide a solids of approximately 40% by weight is now added and mixing is continued until a uniform slurry has been obtained. The slurry is then removed from the mixer and placed into a form corresponding in approximate size and shape to the dimension of the finished brake or clutch member. The form is placed in a press and sufficient pressure applied to express the greater portion of the fluid phase. Felts above and below the stock in the form aid in the extraction of the liquid medium. The formed articles are placed on screens and allowed a 24 to 48 hour air-dry and aging period.

During this period and in fact soon after the molding period an exothermic reaction spontaneously takes place on the surface and within the friction element and it acquires a marked increase in strength. The reaction that takes place is essentially an oxidation of the iron particles yielding as an end product a substance or substances that I believe equivalent or similar to iron rust. This oxidation continues for a period and gradually diminishes as the heat of the reaction distills off the bulk of the water and the particles approach an oxidized state.

After completion of the aging period, the dry or near-dry articles are placed into an oven for a heat treatment to remove remaining liquid medium from within the article. The purpose of this treatment is to prepare the article for a saturation with a water solution of electrolytes or oxidizing agents to promote a further oxidation of free iron particles. Examples of electrolytes that may be used are sodium or ammonium chloride, sodium or ammonium sulfate, sodium or ammonium nitrate. The concentration of the substance or substances is variable but may be, for illustration, taken as 5%. The salts above are given only as examples and I do not limit myself to their use, alone or in admixture, or to a specific concentration and other corrosion or oxidation producing materials such as acids and acid salts may be used to promote development of the binder.

Having dried the articles as outlined they are now placed into the solution and saturated for a period sufficiently long to thoroughly wet the interior of the article. This point may be determined by an examination of the interior of a broken test piece. The members are now removed from the saturant and placed on an arbor or screens to provide maximum possible airspace. The screens or rods are now placed into an autoclave and compressed air fed to autoclave until a pressure of approximately ten pounds is reached. Live steam is then permitted to enter the autoclave until a pressure of approximately eighty pounds is reached. The stock is allowed to remain in this atmosphere for a period usually three hours. When the autoclave is opened the stock will be found to exhibit a marked change in color due to the formation of the various hydrated oxides of iron and the stock will have acquired a further increase in strength. After this second reaction period there is little or no further reaction on subsequent wettings or heat treatment although I do not claim that a further reaction is not possible.

Having carried the oxidation of the iron particles to a point of apparent completion the stock is now treated to an open cure to remove free water and to promote a combination of free iron, if present, with sulfur. Thus the initially compounded sulphur in addition to acting as an oxidation or reaction promoter, is utilized as an agent for converting residual unoxidized iron to a more stable form and to thereby fix the characteristics of the final friction element. An example of one cure that may be given is as follows: Into oven at room temperature, rise to 400 degrees F. at a rate of 100 degrees per hour, ten hours at 400 F. A machining to proper shape and dimension completes the process for producing the final friction element.

Although I have stated that the process is one of oxidation and that ultimately the powdered iron is converted to the oxides or hydrated oxides of iron such as iron rust, several complex reactions take place which are impossible to define quantitatively with any degree of certainty, and particularly when use is made of sulphur as one of the compounding ingredients, but it is known that at intermediate stages of the reaction there is formed at least sulphurous acid, iron sulfite and iron chloride when the electrolyte is a chloride, and thus with other electrolytes and promoters, corresponding intermediate reactions and compounds may be formed.

As an alternate method of dry molding with the aid and use of an auxiliary binder, the compound as outlined above (without liquid phase) can be dry mixed with a percentage of a powdered heat setting resin or similar substance. This compound may now be formed in a dry state in a mold under mild heat and pressure to obtain a preliminary unitary structure. The iron particles are then oxidized substantially as previously set forth. By this method fewer precautions are necessary in order to prevent loss of potential structure and bonding formation due to oxidation of the iron particles previous to the shaping operation. The effect of the auxiliary binder is apparent in the finished article from a strength and friction modifying standpoint. It should be understood that the use of an auxiliary binder is not limited to thermo setting substances such as molding resins but is intended to include organic or inorganic substances having molding or saturating characteristics well known in the friction material art.

Friction elements made according to the teaching above have a basic or characteristic high friction. High friction is commonly associated with high wear but the high friction of an element prepared under this invention is not a function of the wear rate. For many uses it is desirable to add two to three times more graphite than is indicated in the formula cited as an example in order to reduce it. Friction compositions have been developed showing a range of coefficient from 0.15 to 0.60. The formula cited as the first example will yield a coefficient of friction in the higher range.

As an example of a compound that will yield a coefficient of friction in the median range the following is given:

| | Parts by weight |
|---|---|
| Powdered iron | 40.0 |
| Asbestos fibre | 40.0 |
| Sulfur | 0.8 |
| Graphite | 19.2 |

As an example of a compound that will yield a coefficient of friction in the lower range the following is given:

| | Parts by weight |
|---|---|
| Powdered iron | 35 |
| Asbestos fibre | 45 |
| Graphite | 10 |
| Powdered gilsonite | 10 |

In this latter example the mixing and forming is done substantially as previously directed. The method of oxidation of the iron particles, however, is preferably carried on at room temperature. This may be carried out by wetting the stock with the electrolytic solution followed by an aging period allowing maximum air space and the process repeated for as many times as may be necessary to oxidise the iron or the stock may be placed into an autoclave on an arbor or screens and straight air pressure applied for a time sufficient to react the bulk of the iron. The stock is then placed into cure and the heat treatment is adjusted to allow an in situ saturation of the stock with the melted gilsonite after which it is cured to insolubility.

Although I make no claim as to the exact composition of the oxidized mass I do know that when the reaction takes place within the molded article it is accompanied by an interlocking action and unification of the stock into a body having relatively high strength. If water is used as the total liquid phase proper steps of a physical or chemical nature can be taken to minimize oxidation of the iron particles previous to the preform operation. For example, the water can be treated to remove impurities and dissolved gases, the mixing can be carried out under vacuum or inert atmosphere or the fibre can be pretreated or selected for specific properties.

I claim as my invention:

1. A friction element composed of major proportions by weight of fibrous asbestos and oxidation products of iron in binding relationship therewith.

2. A friction element composed of major proportions by weight of fibrous asbestos and the corrosion products of iron as the essential binder thereof.

3. A friction element composed of major proportions by weight of asbestos and iron in the form of its oxidation products formed in situ and comprising the essential binder thereof.

4. A friction element composed of major proportions by weight of asbestos and iron in the form of its oxidation products formed in situ and comprising the essential binder thereof, the said element having a coefficient of friction of from approximately 0.15 to 0.60.

5. A friction element composed of major proportions by weight of fibrous asbestos and particles of iron, the said iron particles being substantially completely in the form of oxides formed in situ and in binding relationship in said element.

6. A friction element composed of major proportions by weight of fibrous asbestos and powdered iron and a minor proportion of sulphur, the said iron being substantially completely in the form of oxides thereof and in minor proportion in the form of iron sulfite formed in situ, the said conversion products of iron comprising the essential binder for said element.

7. A friction element composed of major proportions by weight of fibrous asbestos and particles of iron, and minor proportions of sulfur and an electrolyte, the said iron being substantially completely in the form of its oxidation products formed in situ a pre-shaped element and comprising the essential binder thereof.

8. A friction element comprising asbestos, a friction modificant material and as the predominant binder thereof oxidation products of iron.

9. A friction element comprising essentially asbestos and a predominant binder consisting of the oxidation products of iron, and a secondary binder.

10. A friction element comprising essentially asbestos and a predominant binder consisting of the oxidation products of iron, and a secondary organic binder.

11. A method of making friction material suitable for clutch facings, brake linings and the like, which comprises intimately mixing and shaping into the form of a friction element a composition comprising essentially asbestos and particles of iron, and thereafter inducing oxidation to substantially completely convert the compounded iron to its oxides in situ said shaped element.

12. A method of making friction material suitable for clutch facings, brake linings and the like, which comprises intimately mixing and shaping into the form of a friction element a composition comprising essentially asbestos and particles of iron, and thereafter subjecting said shaped element to the action of air and water to substantially completely corrode the iron constituent thereof.

13. A method of making friction material suitable for clutch facings, brake linings and the like, which comprises intimately mixing and shaping into the form of a friction element a composition comprising essentially asbestos and particles of metallic iron, and thereafter subjecting said element to treatment with a solution of an electrolyte in the presence of an oxygen source to substantially completely convert the iron to its oxidation products.

14. A method of making friction material suitable for clutch facings, brake linings and the like, which comprises intimately mixing and shaping into the form of a friction element a composition comprising essentially asbestos and particles of metallic iron, subjecting said shaped element to the action of air and water, and thereafter treating it with an electrolyte in an ionizing solvent and in the presence of an oxygen source to substantially completely convert said iron in situ to its oxidation products.

15. A method of making a friction element which comprises intimately mixing a composition comprising in major proportions by weight fibrous asbestos and finely divided particles of iron, shaping said composition into the form of an element, and thereafter inducing oxidation to substantially completely convert said iron to its oxides in situ said shaped element and to become the essential binder thereof.

16. A method of making a friction element which comprises dry mixing a composition comprising essentially fibrous asbestos and powdered iron, adding water to said mixture, and shaping in the form of an element, exposing said shaped element to air to permit oxidation of said iron particles to take place, and thereafter subjecting the element to the action of an oxidizing reagent to substantially completely convert the iron to its oxidation products and to form the essential binder of said element.

17. A method of making a friction element which comprises dry mixing a composition comprising essentially fibrous asbestos and powdered iron, adding water to said mixture, and shaping in the form of an element, exposing said shaped element to air to permit oxidation of said iron particles to take place, impregnating it with an aqueous solution of an electrolyte, and thereafter subjecting it to the action of steam and air under pressure to substantially completely convert the iron to its oxidation products and to form the essential binder of said element.

18. A method of making a friction element which comprises dry mixing a composition comprising major proportions by weight of fibrous asbestos and powdered iron and minor proportions of graphite and sulphur, forming an aqueous slurry of said mixture, shaping a friction element therefrom, permitting the shaped element while retaining water to be exposed to air to permit free corrosion cure of the iron particles to take place, expelling residual moisture therefrom, impregnating it with an aqueous solution of an electrolyte and subjecting it to the action of air and steam under pressure to substantially completely convert the iron to its oxidation products, and thereafter heat treating the element to combine residual free iron and sulfur.

19. A method of making a friction element which comprises dry mixing a composition comprising major proportions by weight of fibrous asbestos and powdered iron and a minor proportion of an auxiliary binder having molding characteristics, molding an element therefrom under mild heat and pressure, and thereafter treating said molded element with an aqueous solution of an electrolyte in the presence of air to substantially convert the iron to its oxides and to form a predominant binder constituent of said element.

20. A method of making a friction element which comprises dry mixing a composition comprising major proportions by weight of fibrous asbestos and powdered iron and a minor proportion of an auxiliary organic binder, shaping said composition in the form of an element by molding under mild heat and pressure, and thereafter treating said molded element with an aqueous solution of an electrolyte in the presence of air to substantially convert the iron to its oxides and to form a predominant binder constituent of said element.

21. A method of making a friction element which comprises dry-mixing a composition comprising major proportions by weight of fibrous asbestos and powdered iron and a minor proportion of a thermo-plastic thermo-setting auxiliary binder, molding an element from said composition under mild heat and pressure, treating said molded element with an electrolyte in an ionizing solvent in the presence of an oxygen source to substantially convert the iron to its oxides and to form the predominant binder constituent of said element, and thereafter subjecting said element to heat to cure said auxiliary binder.

22. A method of making a friction element which comprises dry-mixing a composition comprising major proportions by weight of fibrous asbestos and powdered iron and minor proportions of graphite, sulphur and a heat curable auxiliary binder having molding characteristics, shaping an element therefrom by molding under mild heat and pressure, treating said shaped element with a water solution of an electrolyte in the presence of air to substantially convert the iron to its oxides and to form the major binder constituent of said element, and thereafter subjecting said element to heat to cure said auxiliary binder and to combine residual free iron with sulphur.

RUDOLPH EDWARD STECK.